US011904817B2

(12) United States Patent
Lam et al.

(10) Patent No.: US 11,904,817 B2
(45) Date of Patent: Feb. 20, 2024

(54) PIPE CONNECTOR ASSEMBLY AND TIRE MAINTENANCE APPARATUS HAVING SAME

(71) Applicant: Active Tools International (HK) Ltd., Hong Kong (CN)

(72) Inventors: Koonfung Lam, Hong Kong (CN); Huilong Ji, Hong Kong (CN); Jianghua Yan, Hong Kong (CN)

(73) Assignee: Active Tools International (HK) Ltd., Hong Kong (CN)

( * ) Notice: Subject to any disclaimer, the term of this patent is extended or adjusted under 35 U.S.C. 154(b) by 304 days.

(21) Appl. No.: 17/293,067

(22) PCT Filed: Nov. 16, 2018

(86) PCT No.: PCT/CN2018/115923
§ 371 (c)(1),
(2) Date: Oct. 6, 2021

(87) PCT Pub. No.: WO2020/097921
PCT Pub. Date: May 22, 2020

(65) Prior Publication Data
US 2022/0126795 A1 Apr. 28, 2022

(51) Int. Cl.
*B60S 5/04* (2006.01)
*F16K 15/06* (2006.01)
(Continued)

(52) U.S. Cl.
CPC ............... *B60S 5/04* (2013.01); *B29C 73/02* (2013.01); *B29C 73/24* (2013.01); *F16K 15/065* (2021.08);
(Continued)

(58) Field of Classification Search
CPC ............... B60S 5/04; Y10T 137/3724; Y10T 137/87957
(Continued)

(56) References Cited

U.S. PATENT DOCUMENTS 1,480,297 A * 1/1924 Parker ............... G05D 16/0655
137/225
1,584,934 A * 5/1926 Harris ..................... B60S 5/04
137/557
(Continued)

FOREIGN PATENT DOCUMENTS

CN 1990314 A 7/2007
CN 201745556 U 2/2011
(Continued)

OTHER PUBLICATIONS

Extended European Search Report dated Jun. 13, 2022, issued in corresponding European Patent Application No. 18940175.5.
(Continued)

*Primary Examiner* — Robert K Arundale
(74) *Attorney, Agent, or Firm* — Morgan, Lewis & Bockius LLP

(57) ABSTRACT

The present invention relates to a pipe connector assembly and a tire maintenance apparatus having the same. The pipe connector assembly comprises a leak-proof valve, and the leak-proof valve is opened only after a sealed fluid medium path is formed between the pipe connector assembly and the tire valve when the pipe connector assembly is screwed to the tire valve. The present invention advantageously prevents fluid medium leakage at the connection between the pipe connector assembly and the tire valve.

18 Claims, 2 Drawing Sheets

(51) Int. Cl.
   *B29C 73/02* (2006.01)
   *B29C 73/24* (2006.01)
   *B29L 30/00* (2006.01)
(52) U.S. Cl.
   CPC .... *B29L 2030/00* (2013.01); *Y10T 137/87957* (2015.04)
(58) Field of Classification Search
   USPC .......................................................... 141/38
   See application file for complete search history.

(56) References Cited

U.S. PATENT DOCUMENTS

| | | | |
|---|---|---|---|
| 6,651,689 B1 | 11/2003 | Stech | |
| 8,978,716 B2 | 3/2015 | Chou | |
| 2001/0025659 A1* | 10/2001 | Smith, III | F16L 1/26 137/614.04 |
| 2005/0087245 A1* | 4/2005 | Magnus | F16L 29/02 137/877 |
| 2005/0164538 A1* | 7/2005 | Tiberghien | F16L 29/04 439/289 |
| 2013/0284312 A1* | 10/2013 | Chou | F16K 15/20 141/38 |
| 2017/0191595 A1* | 7/2017 | Van Scyoc | F16L 37/23 |
| 2019/0100062 A1* | 4/2019 | Kuo | F16K 24/02 |
| 2019/0193349 A1* | 6/2019 | Chou | B60S 5/04 |
| 2020/0376908 A1* | 12/2020 | Chou | F16L 19/005 |
| 2021/0078372 A1* | 3/2021 | Chou | B60C 29/064 |
| 2021/0086571 A1* | 3/2021 | Chou | B29C 73/025 |
| 2022/0146031 A1* | 5/2022 | Lusso | F16L 37/1215 |

FOREIGN PATENT DOCUMENTS

| | | |
|---|---|---|
| CN | 202391694 U | 8/2012 |
| CN | 202972258 U | 6/2013 |
| CN | 105736324 A | 7/2016 |
| CN | 206856061 U | 1/2018 |
| DE | 20 2012 103464 U1 | 12/2012 |
| EP | 2186628 A1 | 5/2010 |
| JP | 2007-182036 A | 7/2007 |
| JP | 2009-029036 A | 2/2009 |
| JP | 3165288 U | 1/2011 |
| JP | 2011-131535 A | 7/2011 |

OTHER PUBLICATIONS

International Search Report (with partial translation) and Written Opinion dated Aug. 19, 2019, issued in corresponding International Patent Application No. PCT/CN2018/115923.
Office Action with search report dated Feb. 25, 2023, issued in corresponding Chinese Patent Application No. 201880099518.1.
Examination Report dated Nov. 1, 2022, issued in corresponding Indian Patent Application No. 202147026076.
Office Action dated Nov. 8, 2022, issued in corresponding Japanese Patent Application No. 2021-526587.

* cited by examiner

PIPE CONNECTOR ASSEMBLY AND TIRE MAINTENANCE APPARATUS HAVING SAME

TECHNICAL FIELD

The present invention relates to the technical field of vehicle maintenance, and specifically, the present invention relates to a pipe connector assembly, and further to a tire repairing machine.

BACKGROUND

In order to facilitate a user's handling of abnormal conditions of a tire such as gas loss, breakage, etc. occurring in car travelling, many vehicle manufacturers provide users with on-board tire maintenance apparatus, such as, but not limited to, tire repairing machine, inflator, and tire repairing inflators, and the like.

Generally speaking, a tire maintenance apparatus may inflate a tire (when inflation is required) or deliver sealant into a tire (when repairing is needed) by connecting the tire valve with a hose.

In the prior art, the end of the hose of the tire maintenance apparatus is typically provided with a pipe connector assembly for connection with the tire valve. For example, one commonly used pipe connector assembly includes only a channel structure for the flow of gas or sealant and a threaded connection structure for connecting the tire valve. Another commonly used pipe connector assembly may also be provided with a one-way valve solely for preventing backflow of gas or sealant into the tire maintenance apparatus.

A problem with these pipe connector assemblies is that it is difficult for a user to determine if the bonding between the pipe connector assembly and the tire valve is tight, and that the sealant is liable to leak if the bonding between the pipe connector assembly and the tire valve is not tight.

SUMMARY OF THE INVENTION

An object of an aspect of the present invention is to provide an improved pipe connector assembly.

An object of another aspect of the present invention is to provide a tire maintenance apparatus that includes the foregoing pipe connector assembly.

In order to achieve the foregoing objects, a first aspect of the present invention provides a pipe connector assembly, wherein the pipe connector assembly comprises:
a body having an internal channel for a fluid medium;
a leak-proof valve comprising:
  a valve seat hermetically coupled to the body and having a sealing ring juxtaposed on a surface of an outlet end of the valve seat;
  a valve core having a thimble extending through the valve seat for abutting a tire valve core and opening an gas path sealing of a tire valve when the pipe connector assembly is connected to the tire valve; and
  a reset element that biases the valve core toward the valve seat within the internal channel,
a connection head located on the body for connecting the pipe connector assembly to the tire valve, and wherein the tire valve abuts against the sealing ring when the connection head tightly connects the pipe connector assembly with the tire valve such that the sealing ring provides a sealed fluid medium path between the valve seat and the tire valve;
wherein the tire valve core is capable of pushing the thimble to open the leak-proof valve only after the sealed fluid medium path is formed between the valve seat and the tire valve.

Optionally, in the pipe connector assembly as described above, the valve core has a support on which the reset element abuts.

Optionally, in the pipe connector assembly as described above, the support is provided with an aperture that allows passage of the fluid medium to the valve seat.

Optionally, in the pipe connector assembly as described above, the body of the valve core and at least one of the thimble and the support are configured to be an integral component.

Optionally, in the pipe connector assembly as described above, the valve core and the valve seat both have a tapered bonding face and the sealing ring is embedded in at least one of the tapered bonding faces.

Optionally, in the pipe connector assembly as described above, the body and at least one of the connection head and the valve seat are configured to be an integral component.

Optionally, in the pipe connector assembly as described above, the valve seat is located at the outlet end of the body.

Optionally, in the pipe connector assembly as described above, the valve seat is bonded to an outer peripheral surface of the body by a locking cap.

Optionally, in the pipe connector assembly as described above, the valve seat is located within the internal channel of the body.

Optionally, in the pipe connector assembly as described above, the valve seat is in threaded connection with the body and a full loop of sealing gum is applied along threads.

Optionally, in the pipe connector assembly as described above, the reset element is a coil spring with one end abutting the body and the other end abutting the valve core.

Optionally, in the pipe connector assembly as described above, the connection head is in threaded connection with the tire valve.

Optionally, in the pipe connector assembly as described above, the sealing ring is juxtaposed with the valve seat within the connection head.

Optionally, in the pipe connector assembly as described above, in the process of gradually connecting the connection head tightly to the tire valve:
firstly, the connection head is connected to the tire valve;
secondly, the thimble pushes against the tire valve core and opens the gas path sealing of the tire valve;
then, the tire valve abuts against the sealing ring such that the sealing ring provides the sealed fluid medium path between the valve seat and the tire valve;
afterwards, the tire valve core pushes against the thimble and opens the leak-proof valve; and
finally, a tight connection is achieved between the connection head and the tire valve.

In order to achieve the foregoing objects, a second aspect of the present invention provides a tire maintenance apparatus having the pipe connector assembly as described in any embodiment of the first aspect.

Optionally, in the tire maintenance apparatus as described above, the tire maintenance apparatus has a hose for delivering a fluid medium, and the pipe connector assembly is disposed at a tail end of the hose.

Optionally, in the tire maintenance apparatus as described above, the tire maintenance apparatus is a tire repairing machine, an inflator, a tire repairing inflator, a tire repairing aeration tank, or an aeration tank.

Optionally, in the tire maintenance apparatus as described above, the tire maintenance apparatus comprises an inflator and/or a glue bucket, the fluid medium being a gas output by the inflator or a sealant output by the glue bucket.

BRIEF DESCRIPTION OF THE DRAWINGS

The disclosure of the present invention will become more apparent with reference to the accompanying drawings. It should be understood that these drawings are for illustrative purposes only and are not intended to limit the protective scope of the present invention. In the drawings.

DETAILED DESCRIPTION OF THE EMBODIMENT(S) OF THE INVENTION

Figure 1:
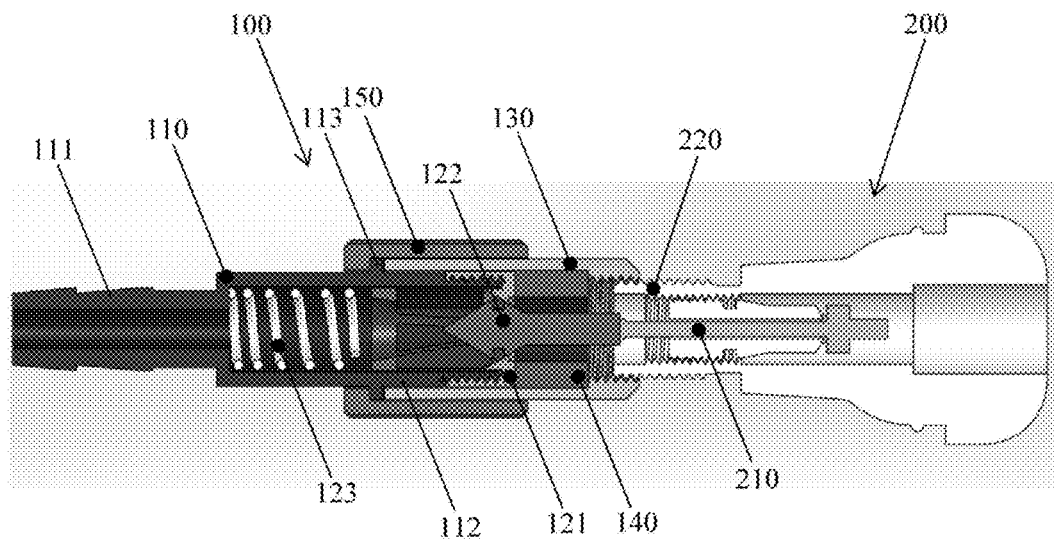
FIG. 1 schematically illustrates a pipe connector assembly according to an embodiment of the present invention, wherein the pipe connector assembly is in an initial state of connecting to a tire valve.

Specific embodiments of the present invention are described in detail below with reference to the accompanying drawings. In the drawings, like reference numerals designate identical or corresponding technical features.

FIG. 1 schematically illustrates a pipe connector assembly 100 according to an embodiment of the present invention, wherein the pipe connector assembly 100 is in an initial state of connecting to a tire valve 200, at which time both the leak-proof valve of the pipe connector assembly 100 and the tire valve 200 are in a closed state.

Figure 2:
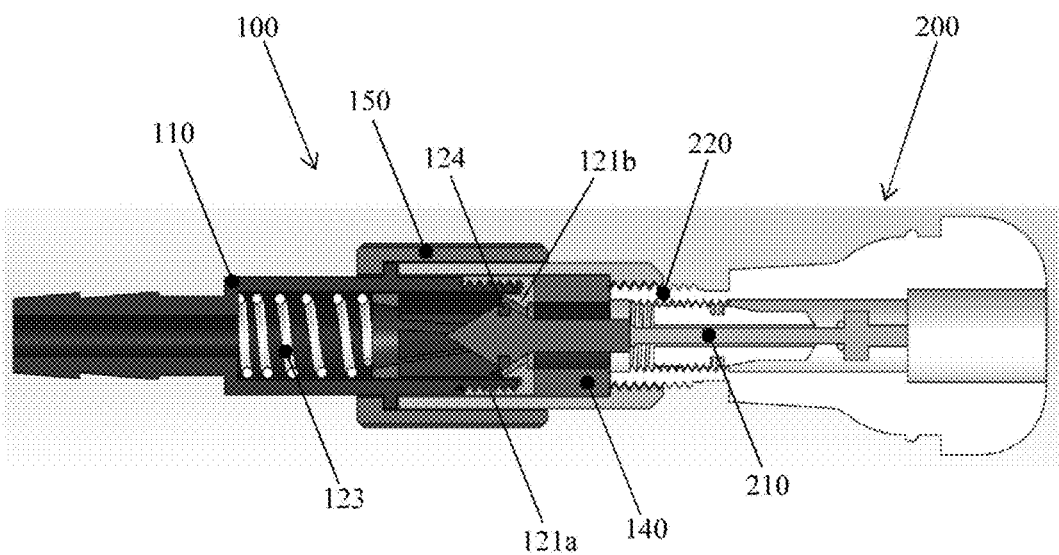
FIG. 2 schematically illustrates the pipe connector assembly of FIG. 1, wherein the pipe connector assembly is in a final state of tightly connecting to the tire valve.

FIG. 2 schematically illustrates the pipe connector assembly 100 of FIG. 1, wherein the pipe connector assembly 100 is in a final state of tightly connecting to the tire valve 200, at which time both the leak-proof valve of the pipe connector assembly 100 and the tire valve 200 are in an open state.

It can be seen from FIGS. 1 and 2 that the pipe connector assembly 100 includes a body 110, a leak-proof valve, a connection head 130, a sealing ring 140, and a housing 150. Also shown in the figures is a tire valve 200 connecting with the pipe connector assembly 100 and a tire valve core 210 in the tire valve 200.

The body 110 has an internal channel for fluidic media. It can be seen that the body 110 may have an inlet end 111 and an outlet end 112 for fluid media. The inlet end 111 is adapted to receive a fluid medium, for example, the inlet end 111 may be connected to the hose of the tire maintenance apparatus to receive the delivered gas or sealant for inflation or repairing of the tire. The fluid medium may go through the internal channel of the body 110 and the leak-proof valve and then be inflated into the tire through the tire valve 200.

In this embodiment, the internal channel of the body 110 extends axially along the body. In an alternative embodiment, the inner channel may extend in an appropriate non-axial or even non-linear manner.

Inside the internal channel, to facilitate assembly of the leak-proof valve, a chamber is formed at the outlet end 112 with a diameter greater than that of the channel at the inlet end 111. A leak-proof valve is mounted within the chamber, for example, as shown in the figure, a reset element (a coil spring in this example) 123 abuts in the chamber near a shoulder of the inlet end 111, providing a biasing force for the valve core 122.

As can be seen from the figures, in this embodiment the leak-proof valve includes a valve seat 121, a valve core 122, and a reset element 123.

The valve seat 121 is hermetically coupled to the body 110 and a sealing ring 140 is juxtaposed on the surface of the outlet end of the valve seat 121. In the context, "coupled" may include bonding in a detachable manner, securing in a non-detachable manner and forming as an integral, and the like.

Here, the sealing coupling between the valve seat 121 and the body 110 prevents fluid medium through the internal channel of the body from leaking between the bonding faces of the body 110 and the valve seat 121. The valve seat 121 is hermetically coupled within the internal channel of the body 110, and may be implemented by, for example, threaded connection between the two, while applying a full loop of sealing gum at the threads. The sealing gum may be applied for two full loops or more along the threads.

A sealing ring 140 juxtaposed at the surface of the outlet end of the valve seat 121 is provided for providing a seal between the valve seat 121 and the tire valve 200. In the example of FIG. 2, this seal is achieved by pressing the sealing ring 140 against the valve seat 121 with the end face of the threaded end 220 of the tire valve 200.

In the illustrated embodiment, the valve seat 121 is located at the outlet end 112 of the body 110. Specifically, the valve seat 121 is bonded to the outer peripheral surface of the body 110 by a locking cap 121a. The locking cap 121a is formed at an outer periphery of the valve seat 121; and the bonding face 121b for mating with the valve core 122 is located in the center of the valve seat. In the illustrated example, the locking cap 121a may be an outer peripheral surface that is in threaded connection with the body 110 while a full loop (e.g., two or more loops along the threads) may be applied.

In an alternative embodiment, the valve seat 121 may also be coupled to the body 110 by other specific manners without providing threads such as, but not limited to, hermetically adhering directly with super glue, socketing or embedding between the two and providing sealing rings, and the like.

Figure 3:
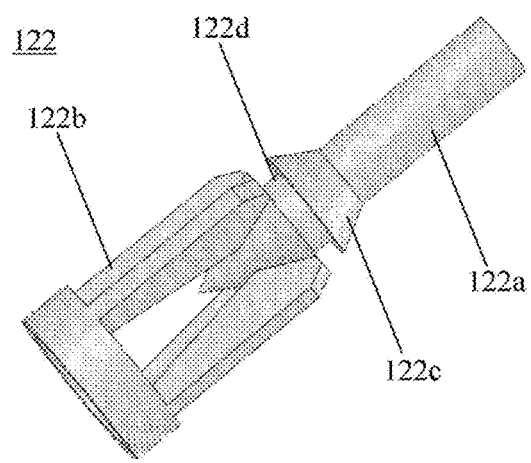
FIG. 3 schematically illustrates a valve core of a leak-proof valve in the pipe connector assembly of FIG. 1.

The leak-proof valve has a valve core 122 that mates with a valve seat 121. One structure of the valve core 122 is illustrated in FIG. 3, more clearly showing the thimble 122a of the valve core 122 and the support 122b.

The thimble 122a in the figure is cylindrical. As can be seen in conjunction with FIGS. 1 and 2, the valve core 122 is mounted in the pipe connector assembly such that the thimble 122a extends through the valve seat 121 for abutting the tire valve core 210 and opening the gas path sealing of the tire valve 200 when connecting the pipe connector assembly 100 to the tire valve 200. In case this function is realized, in an alternative embodiment, the design of the thimble 122a is not limited to be cylindrical, but may be other shapes as well.

The support 122b in the figure includes several legs extending from the body of the valve core 122 and a ring portion formed by connecting the ends of the legs. It can be seen from FIGS. 1 and 2 that the reset element 123 applies a force to close the leak-proof valve to the valve core 122 by biasing the ring portion. To facilitate passage of fluidic media, the support 122b is provided with apertures that allow passage of fluidic media to the valve seat; in the illustrated example, these apertures are formed between the respective legs.

This support may also be eliminated in an alternative embodiment, such that the reset element 123 is directly biased against the body 122c of the valve core 122.

In the illustrated embodiment, the body 122c of the valve core and at least one of the thimble and support may be an integral component. In an alternative embodiment, the valve core may also be constructed by assembling the thimble or support on the body of the valve core.

It can be seen from FIGS. 1 and 2 that the reset element 123 biases the valve core toward the valve seat within the internal channel of the body 110 of the pipe connector assembly 100. In this example, the reset element 123 is a coil spring with one end abutting the body 110 and the other end abutting the valve core 122. Other types of reset elements may also be employed in an alternative embodiment.

In the illustrated example, the valve core and valve seat may each have a tapered bonding face. Other forms of bonding faces may be considered in an alternative embodiment.

A sealing ring may be embedded in the tapered bonding face of at least one of the valve core and the valve seat. For example, a circumferential groove 122d for embedding sealing ring is shown on the valve core of FIG. 3, and in FIGS. 1 and 2 a sealing ring 124 is shown embedded therein. In case that the sealing requirements are satisfied, the sealing ring may also be omitted, or other numbers of sealing rings may be provided, or other forms of seals may be provided in other manners.

The connection head 130 is located on the body 110 for connecting the pipe connector assembly 100 to the tire valve 200.

When the connection head 130 tightly connects the pipe connector assembly 100 to the tire valve 200 (illustrated in the figure as the threaded end 220 through the tire valve), the tire valve (illustrated in the figure as the end face of the threaded end 220 through the tire valve) abuts against the sealing ring 140 such that the sealing ring 140 provides a sealed fluid medium path between the valve seat 121 and the tire valve 200. Only after the sealed fluid medium path is formed between the valve seat 121 and the tire valve 200, the tire valve core 210 pushes the thimble 122a to open the leak-proof valve. As the thimble 122a is pushed, the valve core 122 would compress the reset element 123 so that the valve core 122 is disengaged from the valve seat 121.

The sealing ring 140 is juxtaposed with the valve seat 121 within the connection head 130. In an alternative embodiment, the sealing ring 140 may also be juxtaposed on the end face of the valve seat 121 in an embedding manner, i.e., the sealing ring 140 is embedded on the end face of the valve seat 121.

After the connection head 130 is screwed to the tire valve 200, the tail end of the tire valve 200 presses against the sealing ring 140 so that the sealing ring 140 also tightly abuts against the valve seat 121, thereby forming a seal between the valve seat 121 and the sealing ring 140, as well as between the sealing ring 140 and the tail end face of the tire valve 200, to provide a sealed fluid medium path together. It will be appreciated that the fluid medium can advantageously be prevented from leaking between the valve seat 121 and the tire valve 200 after the sealed fluid medium path is formed between the valve seat 121 and the tire valve 200.

As shown in the figure, the connection head 130 is in threaded connection with the tire valve 200. In an alternative embodiment, the connection head 130 and the tire valve 200 may also be tensioned or clamped tightly or the like employing other manners, thereby enabling a seal between the valve seat 121 of the leak-proof valve and the tire valve 200.

In an alternative embodiment, the body 110 of the pipe connector assembly 100 and at least one of the connection head 130 and the valve seat 121 may be an integral component adapted to reduce number of parts and to save assembly steps.

In the illustrated embodiment, the pipe connector assembly 100 also has a housing 150. As shown in the figure, the housing 150 is secured to the connection head 130, and the connection head 130 is socketed inside the housing 150, forming an internal circumferential groove that embeds the flange 113 on the body 110. The user may drive the connection head 130 by screwing the housing 150, thereby screwing the connection head 130 onto the tire valve 200 via the threaded connection. To facilitate screwing, uneven patterns may be formed on the surface of the housing 150 to increase friction between the hand and the operating tool.

On the other hand, with the housing 150 secured to the connection head 130, it may also prevent the connection head 130 from disengaging from the body 110 of the pipe connector assembly 100, but allow it to rotate in the circumferential direction relative to the body down the flange 113 to effect tightening. In an alternative embodiment, those skilled in the art may also consider omitting the housing 150, while directly mounting the connection head 130 to the body 110 of the pipe connector assembly 100 in a fixed or circumferentially movable manner.

According to the pipe connector assembly 100 of the present invention, in the process of gradually connecting the connection head 130 tightly to the tire valve 200, the following steps will be experienced: firstly, the connection head 130 is connected to the tire valve 200 (see FIG. 1); secondly, the thimble 122a pushes against the tire valve core 210 and opens the gas path sealing of the tire valve 200; then, the tire valve 200 abuts against the sealing ring 140 such that the sealing ring 140 provides a sealed fluid medium path between the valve seat 121 and the tire valve 200; afterwards, the tire valve core 122a pushes against the thimble 122a and opens the leak-proof valve; and finally, a tight connection is achieved between the connection head 130 and the tire valve 200 (see FIG. 2). It can be seen that in the present invention, the leak-proof valve is only opened after the sealed fluid medium path is formed by the body 110 of the pipe connector assembly 100, the valve seat 121 of the leak-proof valve, the sealing ring 140, and the tire valve 200, advantageously preventing the occurrence of leaking when fluid medium enters the connection portion between the connection head and the tire valve in the prior art.

According to another aspect of the present application, a tire maintenance apparatus is also provided which may have the pipe connector assembly as described above. In an alternative embodiment, the tire maintenance apparatus may include, but not limited to, a tire repairing machine, an inflator, a tire repairing inflator, a tire repairing aeration tank, or an aeration tank, and the like. Compared to products such as the tire repairing machine, the inflators, and the tire repairing inflator with power supplies, the tire repairing aeration tank and the aeration tank are typically used in the absence of a power supply, since high pressure gas is stored in the pump, the pumps can be used directly.

The tire maintenance apparatus may have a hose for delivering fluid media, and the pipe connector assembly may be disposed at the tail end of the hose. In the case of backup, the pipe connector assembly may be stored with the stowed hose either within the tire maintenance apparatus or wound outside the tire maintenance apparatus. For example, the tire maintenance apparatus may have an inflator and/or glue bucket, the fluid medium may be a gas output by the inflator or a sealant output by the glue bucket, the pipe connector assembly may prevent leakage of the gas or sealant during inflation or tire repairing.

The scope of the present invention is not limited solely to what has been described in the foregoing description, but those skilled in the art may make numerous variations and modifications to the embodiments described above without departing from the concepts of the present invention, and such variations and modifications are intended to fall within the scope of the present invention.

The invention claimed is:

1. A pipe connector assembly, comprising: a body having an internal channel for a fluid medium; a leak-proof valve comprising: a valve seat hermetically coupled to the body and having a sealing ring juxtaposed on a surface of an outlet end of the valve seat, a valve core having a thimble extending through the valve seat for abutting a tire valve core and opening a gas path sealing of a tire valve when the pipe connector assembly is connected to the tire valve, and a reset element that biases the valve core toward the valve seat within the internal channel; and a connection head located on the body for connecting the pipe connector assembly to the tire valve, wherein the tire valve abuts against the sealing ring when the connection head connects the pipe connector assembly with the tire valve such that the sealing ring provides a sealed fluid medium path between the valve seat and the tire valve, wherein the tire valve core is capable of pushing the thimble to open the leak- proof valve only after the sealed fluid medium path is formed between the valve seat and the tire valve, and wherein the valve seat is located at the outlet end of the body and the valve seat is bonded to an outer peripheral surface of the body by a locking cap.

2. The pipe connector assembly of claim 1, wherein the valve core has a support on which the reset element abuts.

3. The pipe connector assembly of claim 2, wherein the support is provided with an aperture that allows passage of the fluid medium to the valve seat.

4. The pipe connector assembly of claim 2, wherein the body of the valve core and at least one of the thimble and the support are configured to be an integral component.

5. The pipe connector assembly of claim 1, wherein the valve core and the valve seat both have a tapered bonding face and a second sealing ring is embedded in at least one of the tapered bonding faces.

6. The pipe connector assembly of claim 1, wherein the body and the connection head or the body and the valve seat are configured to be an integral component.

7. The pipe connector assembly of claim 1, wherein the valve seat is located within the internal channel of the body.

8. The pipe connector assembly of claim 1, wherein the valve seat is in threaded connection with the body and a full loop of sealing gum is applied along threads.

9. The pipe connector assembly of claim 1, wherein the reset element is a coil spring with one end abutting the body and the other end abutting the valve core.

10. The pipe connector assembly of claim 1, wherein the connection head is in threaded connection with the tire valve.

11. The pipe connector assembly of claim 1, wherein the sealing ring is juxtaposed with the valve seat within the connection head.

12. The pipe connector assembly of claim 1, wherein in the process of connecting the connection head to the tire valve: firstly, the connection head is connected to the tire valve; secondly, the thimble pushes against the tire valve core and opens the gas path sealing of the tire valve; then, the tire valve abuts against the sealing ring such that the sealing ring provides the sealed fluid medium path between the valve seat and the tire valve; afterwards, the tire valve core pushes against the thimble and opens the leak-proof valve; and finally, a connection is achieved between the connection head and the tire valve.

13. A tire maintenance apparatus, comprising the pipe connector assembly of claim 1.

14. The tire maintenance apparatus of claim 13, wherein the tire maintenance apparatus has a hose for delivering a fluid medium, and the pipe connector assembly is disposed at a tail end of the hose.

15. The tire maintenance apparatus of claim 13, wherein the tire maintenance apparatus is a tire repairing machine, an inflator, a tire repairing inflator, a tire repairing aeration tank, or an aeration tank.

16. The tire maintenance apparatus of claim 13, wherein the tire maintenance apparatus comprises an inflator and/or a glue bucket, the fluid medium being a gas output by the inflator or a sealant output by the glue bucket.

17. The tire maintenance apparatus of claim 14, wherein the tire maintenance apparatus is a tire repairing machine, an inflator, a tire repairing inflator, a tire repairing aeration tank, or an aeration tank.

18. The tire maintenance apparatus of claim 14, wherein the tire maintenance apparatus comprises an inflator and/or a glue bucket, the fluid medium being a gas output by the inflator or a sealant output by the glue bucket.

* * * * *